United States Patent
Hains et al.

(10) Patent No.: US 7,701,496 B2
(45) Date of Patent: Apr. 20, 2010

(54) COLOR FILTER PATTERN FOR COLOR FILTER ARRAYS INCLUDING A DEMOSAICKING ALGORITHM

(75) Inventors: Charles Michael Hains, Altadena, CA (US); Manu Parmar, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 524 days.

(21) Appl. No.: 11/644,377

(22) Filed: Dec. 22, 2006

(65) Prior Publication Data

US 2008/0151083 A1 Jun. 26, 2008

(51) Int. Cl.
  *H04N 3/14* (2006.01)
  *H04N 5/335* (2006.01)
  *H04N 9/04* (2006.01)
  *H04N 9/83* (2006.01)

(52) U.S. Cl. .................. 348/273; 348/294; 348/308

(58) Field of Classification Search ......... 348/272–277, 348/280, 222.1; 250/226; 257/294
See application file for complete search history.

(56) References Cited

U.S. PATENT DOCUMENTS

| | | | | |
|---|---|---|---|---|
| 5,917,556 A | * | 6/1999 | Katayama | 348/223.1 |
| 6,784,941 B1 | * | 8/2004 | Su et al. | 348/207.1 |
| 6,833,868 B1 | * | 12/2004 | Meynants et al. | 348/272 |
| 7,505,206 B2 | * | 3/2009 | Deng et al. | 359/619 |
| 2002/0186223 A1 | * | 12/2002 | Sasaki | 345/589 |
| 2006/0232668 A1 | * | 10/2006 | Horn et al. | 348/71 |
| 2008/0007839 A1 | * | 1/2008 | Deng et al. | 359/642 |

OTHER PUBLICATIONS

Parmar et al., "Optimization of Color Filter Sensitivity Functions for Color Filter Array Based Image Acquisition", Dept. of Elec. and Comp. Eng., Auburn Univ., Auburn, AL, Nov. 2006.

* cited by examiner

*Primary Examiner*—Gevell Selby
(74) *Attorney, Agent, or Firm*—Carter, DeLuca, Ferrell & Schmidt, LLP

(57) ABSTRACT

A device for acquiring color images using a color filter array. The color filter array includes a pattern of red array elements, green array elements, and blue array elements. The red array elements and green array elements occur in the color filter array more frequently than the blue array elements. This multiplicity of red, green, and blue color filters adheres closely to known human visual system (HVS) chrominance and luminance responses. Also, the pattern has periodicity in the diagonal directions and is relatively immune to Moire artifacts that arise due to interference between periodic sampling patterns of the CFA and periodic features in imaged scenes.

19 Claims, 3 Drawing Sheets

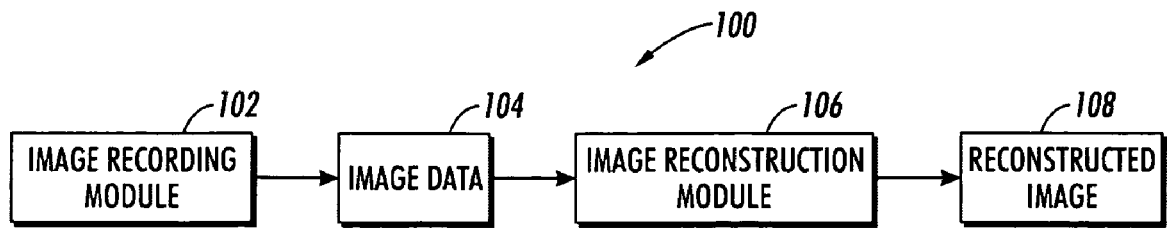
FIG. 1
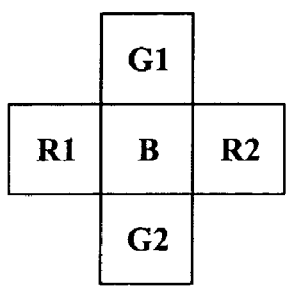
FIG. 2
FIG. 3

COLOR FILTER PATTERN FOR COLOR FILTER ARRAYS INCLUDING A DEMOSAICKING ALGORITHM

BACKGROUND

The present disclosure relates to the field of image capture, and, in particular, to a color filter array and a method for performing color interpolation, also known as demosaicking.

Digital image acquisition devices, such as digital cameras, utilize optical sensors to capture images. The optical sensing elements are typically multi-pixel arrays of charge coupled devices (CCD) or complementary metal oxide semiconductors (CMOS). Both of these sensor types are inherently monochromatic. The incident radiation at each pixel of a sensor-array is integrated over a range of wavelengths (in which the device is sensitive) to give intensity values over the sensor-array. To acquire color images, cameras utilize filters that are sensitive in particular ranges in the visible spectrum that are placed before the optical sensor-array in the imaging pipeline. The sensor-array output is then the image band corresponding to the spectral transmission of the color filter. Since at least three color bands are required to represent an image for the human visual system, at least three sensor-arrays with three different color filters are required to acquire a color image. Although other color combinations are used, arrangements of color filters typically extract the three primary colors: red, green, and blue.

Such multi-sensor acquisition schemes have several drawbacks. For example, multi-sensor cameras typically include one or more beam-splitters that send the light to the different color sensors which contribute substantially to the cost of the camera. Also, since the color bands are acquired at different planes, a post-processing operation is required to correct for the associated misregistration. To avoid the cost and complexity of multi-sensor acquisition systems, most consumer-level digital color cameras employ only one optical sensor. The sensor is overlaid with a color filter array (CFA) such that only one color is sampled at each pixel location. The full-color image is reconstructed from the sub-sampled data in a later step commonly referred to as demosaicking. Demosaicking depends on the pattern that defines the layout of the filters on the pixels of the sensor.

The most significant desirable feature of a CFA pattern, particularly for devices that have limited computational capabilities (cell-phone cameras, low-end digital still cameras, PDA cameras, etc.), is the ease of demosaicking. Regular, repeated CFA patterns work best to satisfy this requirement. Techniques for performing demosaicking, sometimes referred to as "interpolation," are known in the art. For example, U.S. Pat. No. 4,642,678 to Cok, U.S. Pat. No. 5,373,322 to Laroche et al., and U.S. Pat. No. 5,475,769 to Wober et al. describe various methods for recovering missing pixel values from sampled color image data. The Wober patent describes a common approach using a convolution kernel to compute missing pixel values for each pixel location based on the pixel values of a neighborhood of pixels surrounding each pixel location. For an n×m neighborhood of pixels, the convolution kernel is an n×m set of coefficients.

Another useful feature of uniform CFA patterns is their relative immunity to optical and electrical cross-talk among pixels in the sensor array. Cross-talk or leakage between adjoining differently colored pixels can significantly alter the effective spectral transmittance function of a pixel. Regular patterns ensure a measure of consistency in the transmittances of similarly colored pixels across a sensor-array. A drawback of regular arrays is that they may suffer from Moire artifacts, or beats, in cases where the scene has periodic patterns similar in frequency to the period of the CFA pattern.

A successful CFA pattern must adhere to the properties of the human visual system (HVS). One common periodic pattern is known as the Bayer pattern. In a Bayer pattern, green (50%) is sampled at twice the density of either red (25%) or blue (25%) since the luminance response of the human visual system (HVS) corresponds closely with the HVS response to the green range of the spectrum.

The most distinctive features of the HVS are its low-pass response to luminance and chrominance components, and the fact that the cut-off for the luminance component is between two and three times as high as the cut-off for the chrominance components. These properties have been used to arrive at the ideal NTSC human visual R:G:B ratios of 30:59:11. These ratios are difficult to achieve with periodic CFAs formed by repeating 2×2 patterns like the Bayer array.

It is desirable to provide for a CFA with a suitable arrangement of color filters that closely adheres to the properties of the HVS, and also addresses the above-described factors that affect CFA performance.

SUMMARY

According to one aspect of the present disclosure, there is provided a device, and method thereof, for acquiring and reconstructing CFA images. An image recording module generates image data of sampled values output from a color filter array. The device includes an image recording module having an image sensor covered by a color filter array having a novel filter mosaic or pattern for receiving an incident source illumination to produce image data. Advantageously, this pattern adheres closer to the human visual system (HVS) Red:Green:Blue (R:G:B) ratios of 30:59:11 than that of current commercially available CFA patterns.

The pattern of RGB color filters in the pattern of the color filter array is periodic in at least one diagonal direction. Natural scenes have periodic features predominant in the horizontal and vertical directions (a phenomenon which can be attributed largely to the effect of gravity). The pattern of the color filter array thus offers more immunity to Moire as compared to the standard Bayer array.

When the image sensor is exposed to light, each pixel value in the image sensor records either a red, green, or blue color value depending on the color filter applied to that pixel location. The image data is input to an image reconstruction module which performs a demosaicking or interpolation algorithm on the image data to produce a reconstructed image.

BRIEF DESCRIPTION OF THE DRAWINGS

Various embodiments of the present disclosure will be described herein below with reference to the figures wherein:

FIG. 1 illustrates a block diagram of a digital image acquisition device incorporating the present disclosure;

FIG. 2 is a diagram of a novel three color pattern or mosaic of a color filter array according to embodiments of the present disclosure;

FIG. 3 is a unit array of the pattern or mosaic of FIG. 2;

DETAILED DESCRIPTION

Figure 4:
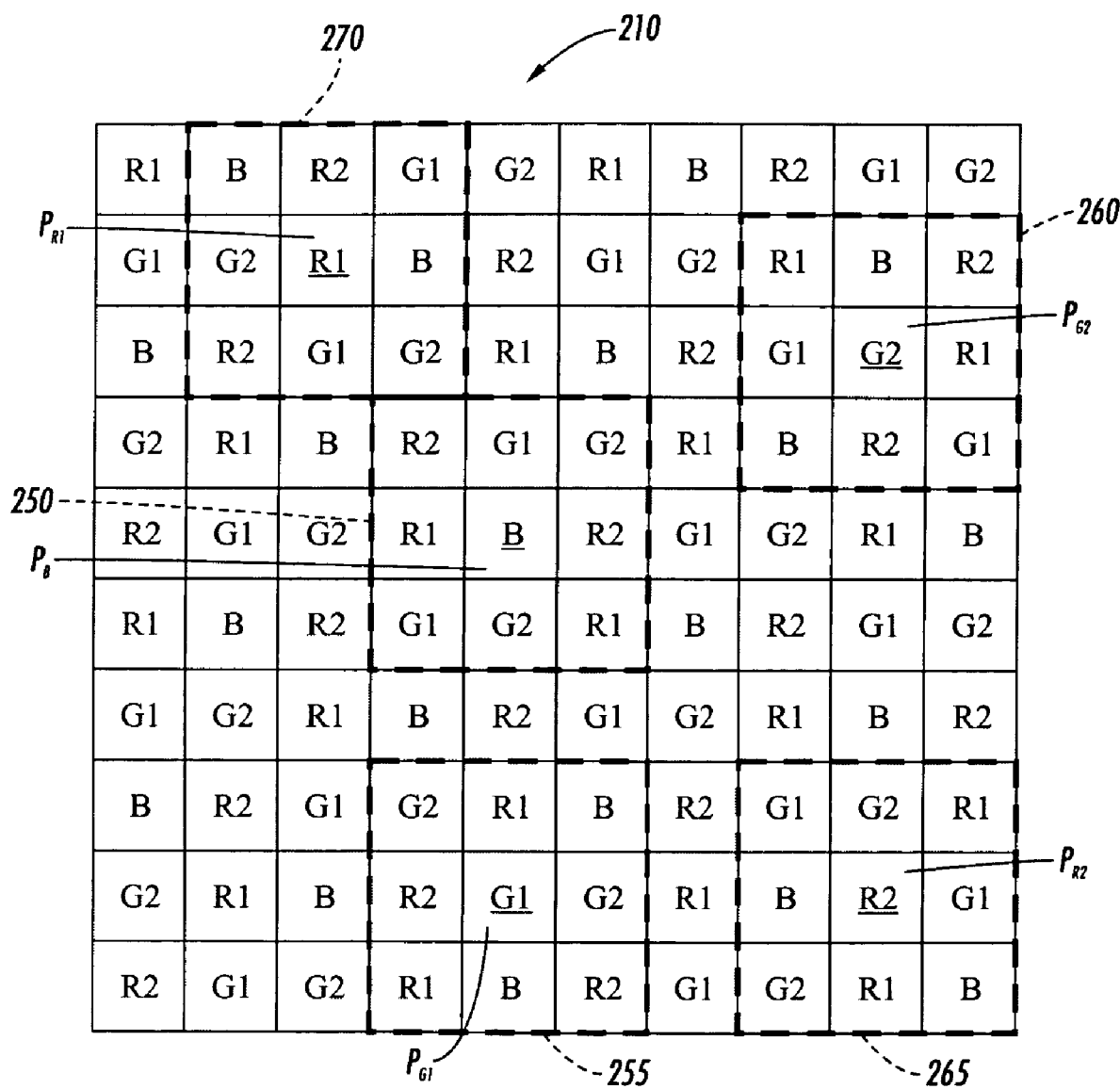
FIG. 4 is an illustration of the pattern or mosaic in which selected neighborhoods and corresponding center pixels are illustrated.

In reference to the drawings, FIG. 1 illustrates a block diagram of a digital image acquisition device 100 incorporating the present disclosure. Device 100 may be, for example, a camera or a scanner. Device 100 includes in part an image recording module 102 that outputs image data 104 to an image reconstruction module 106. As is typical in the art, image recording module 102 may be, for example, a charge coupled device (CCD) or a complementary metal oxide semiconductor (CMOS). Image recording module 102 includes in part an image sensor (not shown) for recording an image through conventional optics. The sensor is typically covered by a filter mosaic or pattern commonly referred to as a color filter array (CFA).

FIG. 2 illustrates a 5×5 mosaic or pattern of a novel CFA 110 in accordance with the present disclosure for receiving incident light (not shown) to produce image data 104. When the image sensor is exposed to light, each pixel value in the image sensor records either a red, green, or blue color value depending on the color filter applied to that pixel location. These color values are converted using a conventional analog to digital converter to generate image data 104, which is input to image reconstruction module 106. Image data 104 may be, for example, a CFA image. It should be appreciated that additional processing may be performed before the CFA image is output to the to image reconstruction module 106. For example, the CFA image may be compressed, transmitted and decompressed prior to reaching image reconstruction module 106.

A processor (not shown) with operating memory (not shown) controls the operation of device 100. The processor receives input signals from a user to record an image by engaging the image recording module. Once part, or all, of the CFA image is produced, the processor engages reconstruction module 106.

Reconstruction module 106 performs a demosaicking or interpolation algorithm on image data 104 to produce a reconstructed image (not shown). The reconstructed image output by reconstruction module 106 may be stored in memory 108 as a full-color or gray-scale full-resolution image for later display or transfer to another device. It should be appreciated that additional processing may be performed before the image is stored in memory 108. For example, the image may be either compressed using a compression method, such as the JPEG standard, or sub-region sampled prior to being stored in memory 108. The demosaicking algorithm is discussed in further detail below.

In accordance with the present disclosure, imaging device 100 further includes a three color Red, Green, Blue (RGB) tiling pattern for a CFA in which the ratio of red, green, and blue filters is approximately 2:2:1. As understood by those skilled in the art, this ratio may be approximate due to "edge effects."

FIG. 3 illustrates a 5-pixel unit array of CFA 110, where $R_n$, $G_n$, and B denote red, green, and blue pass filters, respectively. CFA 110 is provided by repeating the unit array of FIG. 3 in both the row and column directions to tessellate a larger area. As illustrated in FIG. 2, for example, CFA 110 may be a 5×5 mosaic or pattern resulting from the combination of parts of nine of the unit arrays of FIG. 3. Since the unit array is not rectangular, the array formed by tessellating the unit array has "incomplete" units at its edges. Still referring to the unit array FIG. 3, CFA 110 (FIG. 2) includes five distinct color photosites, namely, $R_1$, $R_2$, $G_1$, $G_2$, and B. Optical and electronic cross-talk across CFA 110 is assumed to be isotropic and cross-talk between two color sites is assumed to be dependent only on the distance between the sites.

The colors of CFA 110 according to the present disclosure share neighbors that are similarly spaced and colored. This characteristic of CFA 110 ensures consistent color filter transmittances across the sensor-array. For example, the adjacent neighbors as well as the diagonally adjacent neighbors of both photosites $R_1$ and $R_2$ include one red photosite, two green photosites, and one blue photosite. Likewise, the adjacent neighbors as well as the diagonally adjacent neighbors of both photosites G1 and G2 include two red photosites, one green photosite, and one blue photosite.

In this arrangement, each column of CFA 110 includes a RGB ratio of approximately 2:2:1. Similarly, each row of CFA 110 includes a RGB ratio of approximately 2:2:1. Ultimately, CFA 110 includes 40% red pixels R1, R2, 40% green pixels G1, G2, and 20% blue pixels B. Advantageously, this R:G:B ratio adheres closer to the HVS R:G:B ratios of 30:59:11 than that of the prior art and commercially available CFA patterns.

Figure 5:
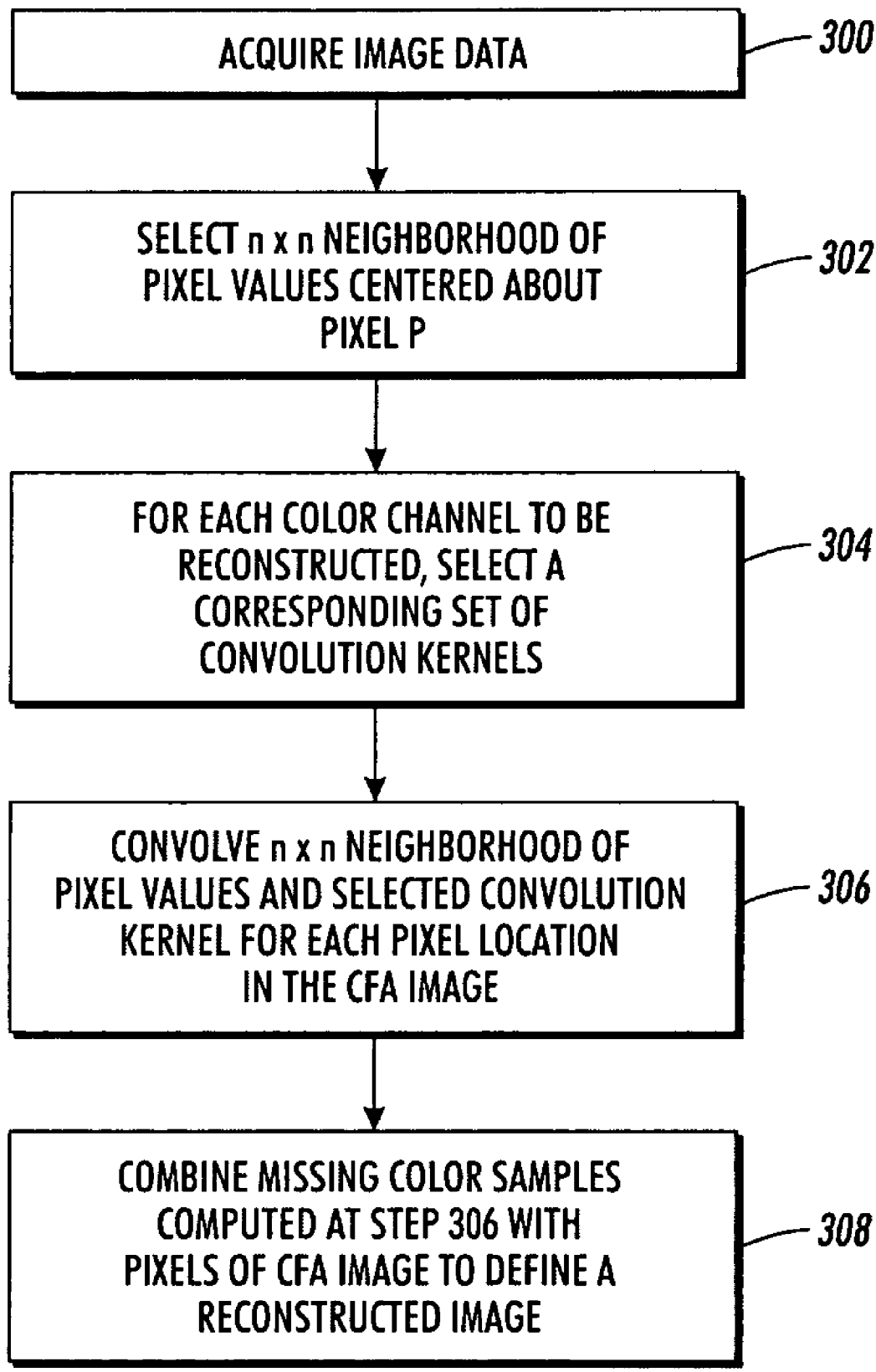
FIG. 5 illustrates a flow diagram that sets forth the demosaicking algorithm performed by the image reconstruction module shown in FIG. 1 to produce a reconstructed image from a CFA image.

Referring now to FIG. 5, a flow chart is shown illustrating an exemplary demosaicking algorithm performed by image reconstruction module 106 for calculating interpolated pixel values using a set of convolution kernels in accordance with the present disclosure. FIG. 5 is illustrative only and other processes for calculating interpolated pixel values can also be used. In the demosaicking process, the CFA image within image data 104 is separated into three distinct sparsely sampled color channels, namely red, green, and blue. Demosaicking requires a set of coefficients for each color channel in the full color image. A different convolution kernel of coefficients is used for each color filter. Convolution kernels, and their respective coefficients, according to the present disclosure are defined for each color filter. The convolution kernels may be stored in imaging device 100 for processing sensor data subsequently captured by imaging device 100 for generating a full color image.

The demosaicking algorithm will now be described in detail with reference to FIGS. 1, 4, and 5. For purposes of example, FIG. 4 illustrates a 10×10 CFA 210 in accordance with the present disclosure. Referring first to FIG. 5, initially at step 300, image recording module 102 of imaging device 100 is used to acquire a CFA image to generate image data 104. Subsequently at step 302, CFA 210 is divided into a plurality of n×m neighborhoods about a center pixel $P_B$, $P_{G1}$, $P_{G2}$, $P_{R2}$, $P_{R1}$, as illustrated in FIG. 4. In the present illustration, the missing pixel values to be reconstructed from the neighborhood of pixels are pixel values for the red, green, and blue color channels.

In accordance with the present disclosure, a neighborhood may be defined, for example, as a center pixel and each pixel immediately surrounding the center pixel in each adjacent row and column. The neighborhood thus defined may be a 3×3 array of pixels (i.e., n=3) centered on each center pixel. In the present example illustrated in FIG. 4, arbitrarily selected neighborhoods 250, 255, 260, 265, and 270 of CFA 210 are centered about center pixels $P_B$, $P_{G1}$, $P_{G2}$, $P_{R2}$, $P_{R1}$, respectively. At step 304, for each color channel to be reconstructed, a corresponding n×m convolution kernel for the color filter associated with center pixel $P_B$, $P_{G1}$, $P_{G2}$, $P_{R2}$, $P_{R1}$ of each of the n×m neighborhoods identified in step 302 is selected.

The following are an exemplary set of convolution kernels according to the present disclosure utilizing a weighted average approach applied to a linear interpolation scheme. Such a scheme may include constants factored into each convolution kernel as illustrated below. The following convolution kernels are illustrative only and other process for calculating interpolated pixel values are envisioned for use with the present disclosure, e.g., edge-adaptive interpolation using convolution with directional kernels, as is understood by those skilled in the art.

For the reconstruction of the red color channel:

$$\text{At } P_B: \frac{1}{(2+2\sqrt{2})}\begin{bmatrix} \sqrt{2} & 0 & 0 \\ 1 & 0 & 1 \\ 0 & 0 & \sqrt{2} \end{bmatrix}$$

$$\text{At } P_{G1}: \frac{1}{(2+2\sqrt{2})}\begin{bmatrix} 0 & 1 & 0 \\ 1 & 0 & 0 \\ \sqrt{2} & 0 & \sqrt{2} \end{bmatrix}$$

$$\text{At } P_{G2}: \frac{1}{(2+2\sqrt{2})}\begin{bmatrix} \sqrt{2} & 0 & \sqrt{2} \\ 0 & 0 & 1 \\ 0 & 1 & 0 \end{bmatrix}$$

For the reconstruction of the green color channel:

$$\text{At } P_B: \frac{1}{(2+2\sqrt{2})}\begin{bmatrix} 0 & 1 & \sqrt{2} \\ 0 & 0 & 0 \\ \sqrt{2} & 1 & 0 \end{bmatrix}$$

$$\text{At } P_{R1}: \frac{1}{(2+2\sqrt{2})}\begin{bmatrix} 0 & 0 & \sqrt{2} \\ 1 & 0 & 0 \\ 0 & 1 & \sqrt{2} \end{bmatrix}$$

$$\text{At } P_{R2}: \frac{1}{(2+2\sqrt{2})}\begin{bmatrix} \sqrt{2} & 1 & 0 \\ 0 & 0 & 1 \\ \sqrt{2} & 0 & 0 \end{bmatrix}$$

For the reconstruction of the blue color channel:

$$\text{At } P_{R1}: \frac{1}{(1+\sqrt{2})}\begin{bmatrix} \sqrt{2} & 0 & 0 \\ 0 & 0 & 1 \\ 0 & 0 & 0 \end{bmatrix} \quad \text{At } P_{R2}: \frac{1}{(1+\sqrt{2})}\begin{bmatrix} 0 & 0 & 0 \\ 1 & 0 & 0 \\ 0 & 0 & \sqrt{2} \end{bmatrix}$$

$$\text{At } P_{G1}: \frac{1}{(1+\sqrt{2})}\begin{bmatrix} 0 & 0 & \sqrt{2} \\ 0 & 0 & 0 \\ 0 & 1 & 0 \end{bmatrix} \quad \text{At } P_{G2}: \frac{1}{(1+\sqrt{2})}\begin{bmatrix} 0 & 1 & 0 \\ 0 & 0 & 0 \\ \sqrt{2} & 0 & 0 \end{bmatrix}$$

The interpolated pixel value for center pixel $P_B$, $P_{G1}$, $P_{G2}$, $P_{R2}$, $P_{R1}$ can now be calculated. In step 306, for each color channel, each pixel's color value is computed out of the original color and the colors of the pixels in the surrounding n×m neighborhood of pixel values, such as neighborhoods 250, 255, 260, and 265. Specifically, for each pixel an n×m convolution kernel is multiplied to the corresponding values of the pixel to be reconstructed and its surrounding neighborhood 250, 255, 260, 265, and 270. The result is a n×m product matrix of missing color samples. The elements of the product matrix are summed and outputted as the interpolated pixel value for center pixel $P_B$, $P_{G1}$, $P_{G2}$, $P_{R2}$, $P_{R1}$ for each color channel. Then in step 308, the missing color samples computed at step 306 are combined with pixels of the CFA image to define a reconstructed image (not shown).

The demosaicking algorithm continues with the next color channel until all the interpolated pixel values for all pixel locations in image data 104 for all color channels are derived.

The demosaicking algorithm may then proceed to calculate the interpolated pixel value for the next center pixel of CFA 210. In this manner, interpolated pixel values for all pixel locations in CFA 210 for all color channels can be calculated.

It will be appreciated that variations of the above-disclosed and other features and functions, or alternatives thereof, may be desirably combined into many other different systems, methods and/or applications. Also that various presently unforeseen or unanticipated alternatives, modifications, variations or improvements therein may be subsequently made by those skilled in the art which are also intended to be encompassed by the following claims.

The invention claimed is:

1. A device for acquiring color images using a color filter array, wherein the color filter array includes red array elements, green array elements, and blue array elements, and wherein said red array elements and said green array elements occur in the color filter array more frequently than said blue array elements, wherein an arrangement of red, green, and blue array elements is periodic in at least one diagonal direction of the color filter array, wherein both the red array elements and green array elements occur approximately twice as frequently as the blue array elements.

2. The device of claim 1 wherein the ratio of red array elements to green array elements is approximately 1:1.

3. The device of claim 1 the blue array elements occur approximately half as frequently as red array elements and green array elements.

4. The device of claim 1 wherein the ratio of red array elements to green array elements to blue array elements is approximately 2:2:1.

5. The device of claim 1 wherein the color filter array includes approximately 40% red array elements, approximately 40% green array elements, and approximately 20% blue array elements.

6. The device of claim 1 wherein the image recording module is a CCD.

7. The device of claim 1 wherein the image recording module is a CMOS.

8. The device of claim 1 wherein the blue array elements are non-adjacent.

9. The device of claim 1 wherein each blue array element includes an adjacent red and green array element.

10. The device of claim 1 wherein the color filter array has five different, repeating rows of array elements and five different, repeating columns of array elements.

11. A device for acquiring color images using a color filter array, wherein the color filter array has a plurality of array elements, the plurality of array elements being responsive to only one of a first color, a second color, or a third color, said array elements responsive to one of the first color and second color occurring in the color filter array more frequently than said array elements responsive to the third color, wherein an arrangement of red, green, and blue color filters is periodic in at least one diagonal direction of the color filter array, wherein the array elements responsive to one of the first color and second color occur approximately twice as frequently as the array elements responsive to the third color.

12. The device of claim 11 wherein the ratio of array elements responsive to the first color to array elements responsive to the second color to array elements responsive to the third color is approximately 2:2:1.

13. The device of claim 11 wherein the plurality of array elements is a three color repeating pattern.

14. The device of claim 13 wherein the three color repeating pattern is red (R) green (G) and blue (B).

15. The device of claim 11 wherein the blue array elements are non-adjacent.

16. The device of claim 11 wherein each blue array element includes an adjacent red and green array element.

17. The device of claim 11 wherein the color filter array has five different, repeating rows of array elements and five different, repeating columns of array elements.

18. A device for acquiring color images using a color filter array, the device comprising: an image recording module for generating an image of sampled values output from the color filter array having a plurality of array elements responsive to only one of a first color, a second color, or a third color, said array elements responsive to the first color and said array elements responsive to the second color occurring in the color filter array more frequently than said array elements responsive to the third color, wherein said image includes a plurality of pixels; an image reconstruction module having a demosaicking algorithm for interpolating said image of sampled values, wherein an arrangement of red, green, and blue array elements is periodic in at least one diagonal direction of the color filter array, wherein the color filter array has at least five different, repeating rows of array elements and at least five different, repeating columns of array elements.

19. The device of claim 18 wherein the blue array elements are non-adjacent, and wherein each blue array element includes an adjacent red and green array element.

* * * * *